Aug. 16, 1955 R. R. TURNER 2,715,677

RADIOTELEGRAPH SYSTEM

Filed July 6, 1951

INVENTOR.
Richard R. Turner
BY Harry M. Saragovitz
Attorney

United States Patent Office 2,715,677

Patented Aug. 16, 1955

2,715,677

RADIOTELEGRAPH SYSTEM

Richard R. Turner, Haddonfield, N. J.

Application July 6, 1951, Serial No. 235,553

1 Claim. (Cl. 250—8)

Figures 1, 2:
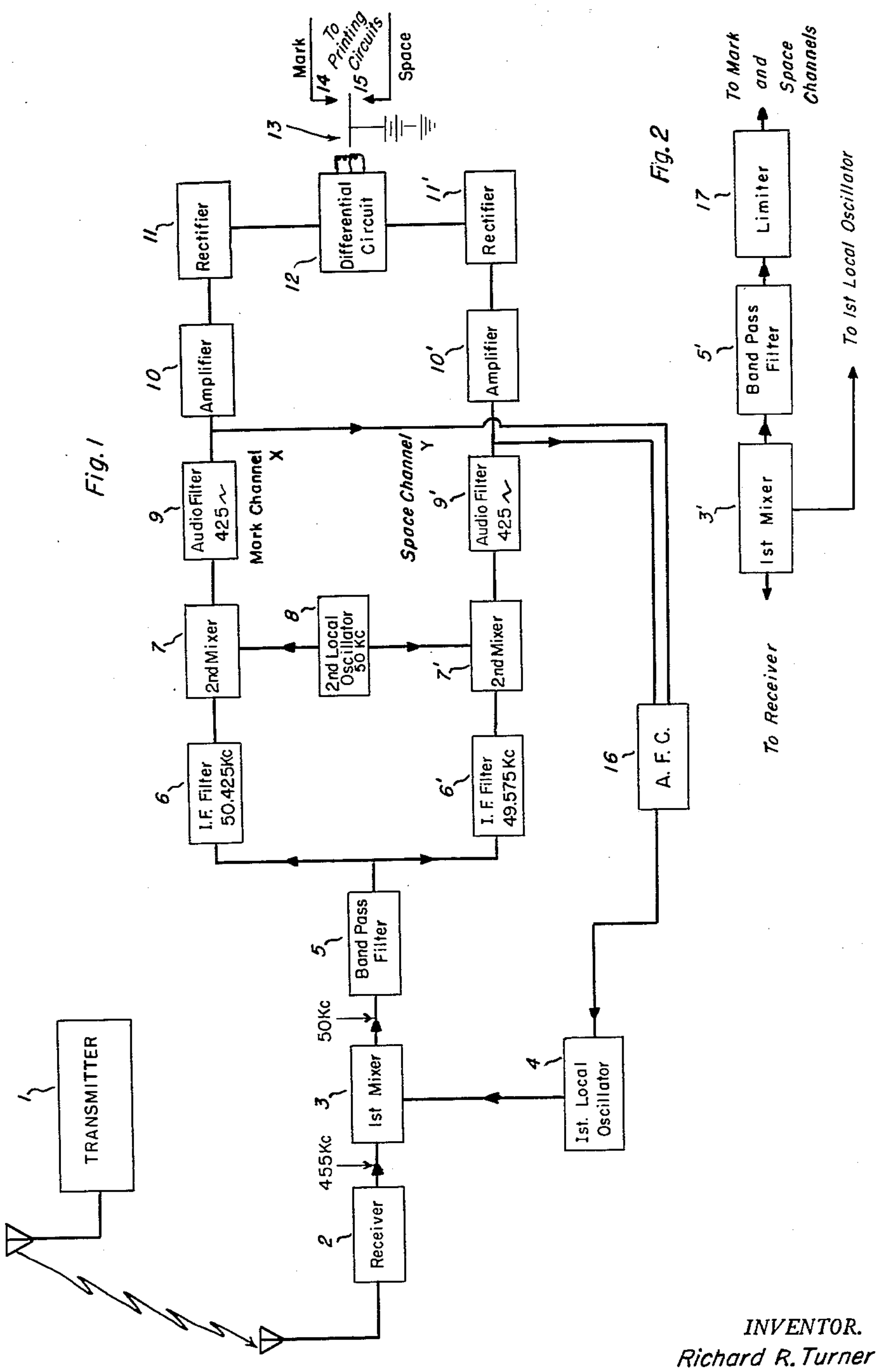

(Granted under Title 35, U. S. Code (1952), sec. 266)

The invention described herein may be manufactured and used by or for the Government for governmental purposes, without the payment to me of any royalty thereon.

This invention relates to a carrier shift radiotelegraph receiving system.

The continuous wave carrier shift telegraph system is a simple, efficient device for the transmission of intelligence. In many of these systems, transmission lines are utilized to convey the coded intelligence to remote points. When this is the case, there is obviously no problem regarding the width of the frequency band used. However, when there is a radio link between the transmitting and receiving stations, the necessity for a frequency band of minimum width is obvious, due to the limitations on the total band of frequencies allotted to radiotelegraph. For example, the high frequency radiotelegraph spectrum includes the band from 2 to 30 megacycles.

An audio frequency wire telegraph circuit operating at 60 to 100 words per minute has a 170 cycle per second separation between the carrier channels. It would, of course, be desirable to limit the separation of radiotelegraph carrier channels in the high frequency ranges to 170 cycles per second but this is not at present possible due to filter and other design difficulties. The separation of carrier channels on wire circuits is determined chiefly by the keying speed while on radio links the separation is determined by the ability of electrical filters to reject carriers that are adjacent in the frequency spectrum.

There are in common use two general types of radiotelegraph receivers, sometimes referred to as diversity receivers, one of which uses selective filters to distinguish the mark and space carriers and the other of which employs discriminators to achieve this function. Both are about equal in performance when used in the presence of adjacent channel interference.

The present invention incorporates the best features of both of these systems to provide a radiotelegraph receiver that is more efficient in rejecting adjacent channel interference and also image frequencies, which are a cause of poor operation of radiotelegraph receivers when a superheterodyne system is utilized.

It is therefore an object of the invention to provide a radiotelegraph receiver that effectively rejects adjacent channel interference.

Another object of the invention is to provide a radiotelegraph system wherein the receiver effectively rejects image frequency interference.

It is still another object of the invention to provide a radiotelegraph receiver that uses two tuned signal channels for mark and space signals respectively to limit adjacent channel and image frequency interference.

It is a further object of the invention to provide a radiotelegraph receiver that utilizes at least two heterodyne oscillators, one of which is connected to each of two signal channels for mark and space signals respectively and arranged to operate at a frequency midway between the mark and space frequencies of said channels.

These and further objects of the invention will be more fully comprehended when the specification is read in connection with the following drawing in which:

Figure 1 illustrates a schematic diagram of the invention in block form and Figure 2 shows a schematic diagram in block form of a modification of Figure 1.

An antenna and radio receiver, in which the signal frequency may be reduced by heterodyning, are utilized to couple the two carrier signals to a mixer where the signals are beat to an intermediate frequency (I. F.) and fed to a band pass filter. At this point, the system is split into mark and space channels which are selectively tuned to the I. F. frequencies and connected to a polar relay through a differential circuit that is responsive to a difference in signal amplitude between the two channels. The contacts of this polar relay are connected to the printing circuits which may be of conventional design.

The invention will be described in more detail with reference to Figure 1 of the drawing. A transmitter 1, which includes an antenna, is of any conventional continuous wave carrier shift type, an example being shown in U. S. Patent 2,118,917 to Finch. The signals are transmitted to an antenna which is coupled to a conventional radio receiver which is preferably arranged to both amplify and reduce the frequency of the received signals, although the latter function may be omitted. Connected to receiver 2 is a converter including a first mixer 3 with a first local heterodyne oscillator 4. The output of the first mixer 3 may be coupled to a band pass filter 5 to improve the rejection of unwanted frequencies, but its use is not necessary for the operation of the invention. A limiter 17, as shown in Figure 2, may also be added after the band pass filter 5 or after the first mixer 3, if the filter it not used, in the event of a wide variation in the amplitudes of the incoming signals. At this stage, the radiotelegraph receiver is split into two channels containing the same circuit components tuned to different I. F. frequencies, referred to hereinafter as mark channel X and space channel Y.

Describing the X channel, the output of band pass filter 5 is fed to an I. F. filter 6, which is peaked to the desired I. F. frequency. The I. F. filter is coupled to a converter including a second mixer 7 having a second local heterodyne oscillator 8. A further audio filter 9 may be employed so that channel X is more selective of the desired frequency. An amplifier 10 may be added and if desired, a rectifier 11 utilized to provide a D. C. output signal to a differential output circuit 12. This circuit is responsive to an unbalance, i. e., a difference in signal amplitude between the X and Y channels. For example, a bridge circuit may be utilized and arranged so that an unbalance in favor of the X channel will cause a polar relay 13 to close mark contact 14 and an unbalance in favor of the Y channel will cause the polar relay 13 to close space contact 15.

The operation of the invention will be described using sample values of frequencies. It is of course obvious that such values are illustrative only and can be varied within a wide range.

The mark and space carriers are detected by radio receiver 2, which has a broad enough band to adequately receive and detect both carriers. The carriers may be heterodyned to an I.-F. of 455 kc. in the receiver 2, this I.-F. stage being about 6 kc. wide. The intermediate frequency filter of this receiver 2 is not sharp enough and its frequency stability not great enough to completely reject the image frequencies and other interfering frequencies such as an adjacent radiotelegraph circuit. The 455 kc. I.-F. is further beat down to 50 kc. by the first mixer 3 and local oscillator 4. The image in this case is 100 kc. removed and will be effectively rejected by the filters in the radio receiver 2. However, interference from an adjacent station a few kc. removed will not be completely rejected.

The 50 kc. is passed through filter 5 to selective I.-F. filters 6 and 6', which are sharply peaked to 50.425 kc. and 49.575 kc., respectively. These I.-F. filters are connected to second mixers 7 and 7' which are coupled to the second local oscillator 8. The frequency of oscillator 8 is fixed midway between the frequencies of I.-F. filters 6 and 6', thereby beating the mark and space frequency I.-F. signals to a common audio frequency. The use of this mid-frequency local oscillator eliminates interference from the image frequencies caused by the local oscillator being on the same side of both the X and Y channel I.-F. frequencies. In the example being considered, the second local oscillator 8 operates at a frequency of 50 kc., beating with the I.-F. frequencies of 49.575 kc. and 50.425 kc. at 425 cycles per second. These audio frequency signals are fed first to filters 9 or 9', then to amplifiers 10 or 10' and finally to rectifiers 11 or 11'. The output terminals of rectifiers 11 and 11' are connected to the differential circuit 12.

It must be emphasized that the difference in signal amplitude between the X and Y channels actuates the printing circuit through differential circuit 12 and polar relay 13. This difference in signal amplitude is due to the selectivity of the two channel filters 6 and 6' at about 50 kc. in the example given.

The most frequently used carrier shift on high frequency radiotelegraph circuits is 850 cycles, as considered in the foregoing explanation, so that the audio output of the last converters is 425 cycles. With a rate of 60 to 100 words per minute, this frequency is high enough to insure a reasonable rectified D.-C. signal wave shape. The use of an 850 cycle shift also makes possible economical filters for the X and Y channels which will still give adequate differential between the mark and space signals. The mark and space signals at 425 cycles may be filtered by the additional band pass filters 9 and 9' which may be approximately 170 cycles wide. However, if the I.-F. filters 6 and 6' are designed to be very selective by utilizing, for example, crystal filters, the audio filters 9 and 9' can be eliminated.

The values of frequencies assumed in the foregoing description are of course only illustrative and may be varied within any reasonable limits. For example, instead of beating the carrier frequency to 455 kc. in receiver 2, the radio receiver 2 may only amplify the incoming carriers as stated above and feed them to the first mixer where they can be heterodyned, for example, to 455 kc. The X and Y channel I.-F. filters 6 and 6' can then be peaked at 454.575 kc. and 455.425 kc. and the second local oscillator arranged to operate at 455 kc. The remaining filters 9 and 9' will remain tuned to 425 cycles since the audio signal will be of the same frequency as in the preceding example.

It is apparent that accurate frequency control and stability are necessary for effective operation. This problem is common in carrier shift continuous wave signalling. An automatic frequency control 16 is shown connected to the X and Y channels and the first local oscillator 4. This arrangement may be employed to effectively control the frequency of the first local oscillator. It is also obvious that the oscillator 4 can be crystal controlled to prevent any drift in frequency that would interfere with the operation of this system.

While what has been described is a preferred embodiment of the invention, it is obvious that various modifications may be made so that the invention is to be limited only by the scope of the claim.

What is claimed is:

In a radio telegraphic communication system for receiving mark and space signals at predetermined different frequencies a receiver comprising a first local oscillator, a first mixer coupled to said first local oscillator and to said receiver for converting the received signals to an intermediate frequency, a first band pass filter coupled to said first mixer to pass the intermediate frequency, a mark signal channel and a space signal channel coupled to said first band pass filter, said mark signal channel including a sharply tuned filter peaked at the mark intermediate frequency and said space signal channel including a sharply tuned filter peaked at the space intermediate frequency, second mixers included in each channel, a second local oscillator coupled to both said second mixers and operating at a frequency midway between the peaked frequencies of the sharply tuned filters for heterodyning the intermediate frequency of each channel to the same audio frequency, selective filters included in each channel for passing the said audio frequency, a rectifier in each channel coupled to said selective filters, a differential output circuit coupled to said rectifiers and responsive to the difference in amplitude of each channel to produce an output indicative of a mark or space signal.

References Cited in the file of this patent

UNITED STATES PATENTS

| | | |
|---|---|---|
| 1,948,671 | Potter | Feb. 27, 1934 |
| 2,033,948 | Lowell | Mar. 17, 1936 |
| 2,211,750 | Humby | Aug. 20, 1940 |
| 2,232,390 | Katzin | Feb. 18, 1941 |
| 2,253,867 | Peterson | Aug. 26, 1941 |
| 2,316,017 | Peterson | Apr. 6, 1943 |
| 2,341,649 | Peterson | Feb. 15, 1944 |
| 2,654,025 | Higgins | Sept. 29, 1953 |